United States Patent [19]

Nagahiro et al.

[11] 3,773,277

[45] Nov. 20, 1973

[54] CONTROL SYSTEM FOR MAGNETIC RECORDING AND REPRODUCING APPARATUS

[75] Inventors: Michinori Nagahiro, Nishinomiya; Toshiomi Yabu, Kyoto; Hiroo Hosono, Hirakata; Masaharu Ushihara, Katano, all of Japan

[73] Assignee: Matsushita Electric Industrial Co., Ltd., Osaka, Japan

[22] Filed: Oct. 13, 1972

[21] Appl. No.: 297,491

[30] Foreign Application Priority Data

Oct. 15, 1971 Japan .................. 46/81993

[52] U.S. Cl. .................. 242/201

[51] Int. Cl. .................. B11b 15/32, G03b 1/04

[58] Field of Search .................. 242/201–204, 242/67.4; 274/4 D, 11 D; 318/7

[56] References Cited

UNITED STATES PATENTS

| | | | |
|---|---|---|---|
| 3,167,264 | 1/1965 | Ohtsu | 242/201 |
| 3,511,451 | 5/1970 | Emmert | 242/200 |
| 3,733,529 | 5/1973 | Ross et al. | 318/7 |

*Primary Examiner*—Leonard D. Christian
*Attorney*—Richard K. Stevens et al.

[57] ABSTRACT

A control system for a magnetic recording and reproducing apparatus of the kind in which a tape is used for recording or reproduction of information. The control system controls the tape movement so that the recording or reproducing operation at a low speed and the fast forwarding or rewinding operation at a high speed can be changed over to each other without requiring manipulation of a stop operation. Further, the recording or reproducing operation can be automatically started without requiring manipulation of start operation even when power supply is interrupted temporarily and is then restored during recording or reproduction.

2 Claims, 1 Drawing Figure

PATENTED NOV 20 1973
3,773,277
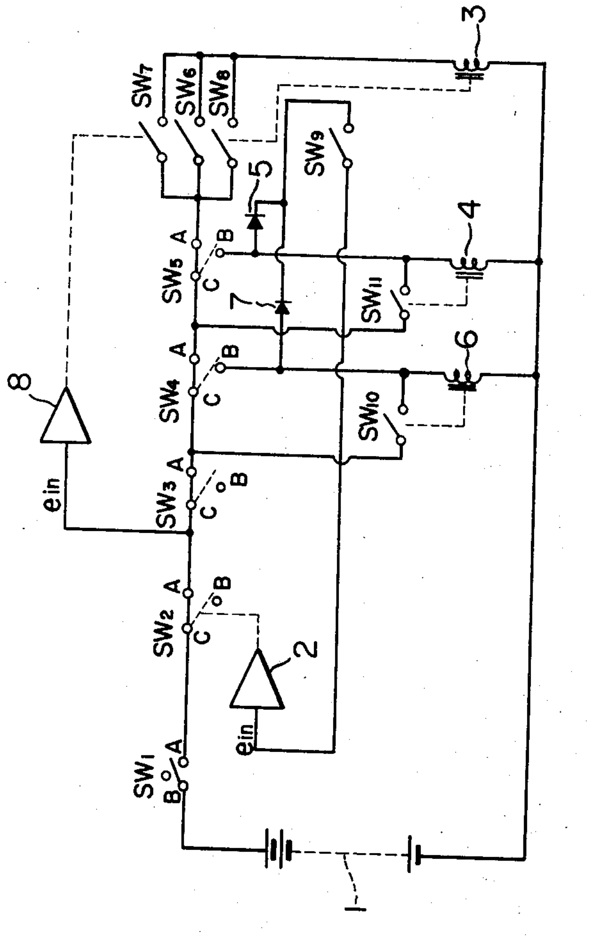

CONTROL SYSTEM FOR MAGNETIC RECORDING AND REPRODUCING APPARATUS

This invention relates to a control system for magnetic recording and reproducing apparatus of the kind in which a magnetic tape is used for recording or reproduction of information.

Troubles such as severing of a magnetic tape due to impartation of an unusually large tension or tangling of the magnetic tape have occurred frequently in prior art magnetic recording and reproducing apparatus of the kind above described when fast forwarding or rewinding operation is abruptly changed over to recording or reproducing operation. Such troubles occur due to the fact that the high speed with which the magnetic tape and reels are fed and rotated during the fast forwarding or rewinding operation is instantaneously reduced to a low speed. It has therefore been common practice to provide a locking mechanism which locks the apparatus against change-over to another operation mode unless a stop operation is necessarily manipulated before the change-over of one operation mode to another or to employ a circuit arrangement which locks the apparatus electrically against change-over of one operation mode to another while permitting mechanically manipulation of operation buttons, so that the recording or reproducing operation can be started necessarily after the manipulation of the stop button.

In the magnetic recording and reproducing apparatus provided with the locking mechanism of the former type, the operation mode with which the apparatus has been operated before interruption of power supply is continued even after restoration of power supply. On the other hand, in the magnetic recording and reproducing apparatus provided with the electrical locking means of the latter type, the operation mode with which the apparatus has been operated before interruption of power supply is released after restoration of power supply and the operation is generally stopped.

When a solenoid is used to control the mechanism of the prior art magnetic recording and reproducing apparatus, the electrical control means of the latter type above described is required so as to electrically maintain an operation mode dictated by the manipulation of a operation button. Especially when such a solenoid is combined with means such as a timer for the purpose of automatic recording, the desired automatic recording cannot be carried out with the prior art magnetic recording and reproducing apparatus provided with the electrical control circuit of the kind above described when power supply is temporarily interrupted and is then restored, due to the fact that the operation mode electrically maintained is released and the operation is stopped resulting in impossibility of subsequent recording.

It is therefore a primary object of the present invention to obviate prior art defects as above described and to provide a novel and improved control system in the form of a single circuit which can automatically change over the operation mode to a recording or reproducing mode when power supply is restored after temporary interruption.

The above and other objects, features and advantages of the present invention will be apparent from the following detailed description taken in conjunction with the accompanying drawing which is an electrical connection diagram of an embodiment of the present invention.

The drawing FIGURE is a diagrammatic view of the invention.

Referring to the drawing, a main power supply switch $SW_1$, a releasing switch $SW_2$ actuated by a first delay means 2, a stop operation switch $SW_3$, a fast forwarding operation switch $SW_4$, a rewinding operation switch $SW_5$, a recording and reproducing operation switch $SW_6$, and a solenoid 3 for driving the recording and reproducing system are connected in series with a power source 1 which is shown herein as a power source.

The contact B of the rewinding operation switch $SW_5$ is connected to the negative terminal of the power source 1 through a solenoid 4 which drives the rewinding system. Further, the contact B of the rewinding operation switch $SW_5$ is connected to the first delay means 2 through a diode 5 and a switch $SW_9$ connected in series. The switch $SW_9$ is arranged for interlocking operation with the recording and reproducing operation switch $SW_6$. The contact B of the fast forwarding operation switch $SW_4$ is connected to the negative terminal of the power source 1 through a solenoid 6 which drives the fast forwarding system. Further, the contact B of the fast forwarding operation switch $SW_4$ is connected to the junction point between the diode 5 and the switch $SW_9$ through a diode 7.

The junction point between the contact A of the stop switch $SW_3$ and the contact C of the fast forwarding operation switch $SW_4$ is connected to the contact B of the fast forwarding operation switch $SW_4$ through a self-holding switch $SW_{10}$ arranged to be urged to the closed position and maintained in such position in response to the energization of the solenoid 6 which drives the fast forwarding system. The junction point between the contact A of the fast forwarding operation switch $SW_4$ and the contact C of the rewinding switch $SW_5$ is connected to the contact B of the rewinding operation switch $SW_5$ through a self-holding switch $SW_{11}$ arranged to be urged to the closed position and maintained in such position in response to the energization of the solenoid 4 which drives the rewinding system. The junction point between the contact A of the releasing switch $SW_2$ and the contact C of the stop switch $SW_3$ is connected to a second delay means 8. A switch $SW_7$ is arranged to be actuated by the second delay means 8. This switch $SW_7$ is urged to the closed position and maintained in such position during a predetermined period of time after voltage is applied to the input terminal $e_{in}$ of the second delay means 8. The solenoid 3 for driving the recording and reproducing system is energized in response to the closure of the switch $SW_7$ so that a self-holding switch $SW_8$ is urged to the closed and self-holding position in response to the energization of the solenoid 3 thereby continuously maintaining the recording or reproducing mode. Therefore, the recording or reproducing mode is automatically established in response to the turn-on of the main switch $SW_1$. The power source 1 may be a commercial a.c. power source and the commercial a.c. voltage may be rectified for driving the system. The same operation as that above described can be carried out even when power supply from the commercial a.c. power source is interrupted temporarily and is then restored.

The first delay means 2 is designed so that, in response to the application of voltage to the input terminal $e_{in}$ thereof, it urges the releasing switch $SW_2$ to the open position and maintains the switch $SW_2$ in such position for a period of time which is slighter longer than the period of time required for stopping a magnetic tape being fast forwarded or rewound.

When the main switch $SW_1$ is in the open position, the remaining switches are in the positions shown by the solid lines and the apparatus is not in operation.

In operation, the second delay means 8 is actuated at first in response to the turn-on of the main switch $SW_1$, and the switch $SW_7$ arranged to be actuated by the second delay means 8 is closed and maintained in the closed position for a predetermined period of time determined by the delay time of the second delay means 8 to energize the solenoid 3 which drives the recording and reproducing system. In response to the energization of the solenoid 3, the self-holding switch $SW_8$ is closed and maintained in the closed position and the solenoid 3 holds itself in the energized state to establish the recording or reproducing mode.

When the fast forwarding operation switch $SW_4$ is changed over to the position B shown by the dotted line in the recording or reproducing mode, the fast forwarding mode is established and the self-holding switch $SW_{10}$ is closed and maintained in the closed position. Further, when the rewinding switch $SW_5$ is changed over to the position B shown by the dotted line in the recording or reproducing mode, the rewinding mode is established and the self-holding switch $SW_{11}$ is closed and maintained in the closed position.

Change-over from the fast forwarding or rewinding mode to the recording or reproducing mode can be done by closing the switch $SW_9$ arranged for interlocking operation with the recording and reproducing operation switch $SW_6$. In response to the turn-on of the switch $SW_9$, voltage is applied to the input terminal $e_{in}$ of the first delay means 2 and the releasing switch $SW_2$ is opened and maintained in the open position for a predetermined period of time determined by the delay time of the first delay means 2 thereby releasing the fast forwarding or rewinding mode. At the time at which the magnetic tape being fast forwarded or rewound is completely stopped, the releasing switch $SW_2$ is closed again to apply voltage to the input terminal $e_{in}$ of the second delay means 8. As a result, the switch $SW_7$ arranged to be actuated by the second delay means 8 is closed and maintained in the closed position for the predetermined period of time to energize the solenoid 3 which drives the recording and reproducing system. In response to the energization of the solenoid 3, the self-holding switch $SW_8$ associated with the solenoid 3 is closed and maintained in the closed position for establishing and maintaining the recording or reproducing mode.

Although the application of voltage to the input terminal $e_{in}$ of the first delay means 2 ceases as soon as the releasing switch $SW_2$ is turned off, suitable means are incorporated in the first delay means 2 so that the releasing switch $SW_2$ can be kept in the open position for a predetermined period of time. The delay time of the first delay means 2 is selected to be longer than the period of time required for the magnetic tape being fast forwarded or rewound to be brought to a halt. The delay time of the second delay means 8 is selected to be longer than the self-holding period of time of the solenoid 3 which drives the recording and reproducing system.

It will be understood from the foregoing description that the change-over from the fast forwarding or rewinding mode to the recording or reproducing mode can be smoothly and reliably attained even when the recording and reproducing operation switch $SW_6$ is directly turned on during the fast forwarding or rewinding operation. Further, even when power supply is interrupted during the recording or reproducing operation for some reason, the recording or reproducing operation can be automatically restarted as soon as the power supply is restored. Thus, the present invention is advantageous in that the omission of recording is limited only to the period of time of power supply interruption even when interruption of power supply occurs during recording while setting the recording time by means such as a timer. The present invention is further advantageous in that the recording or reproducing operation can be automatically started at any desired time preset by means such as a timer.

What is claimed is:

1. A control system for a magnetic recording and reproducing apparatus comprising a first self-holding solenoid for driving the recording and reproducing system, a second self-holding solenoid for driving the rewinding system, a third self-holding solenoid for driving the fast forwarding system, a plurality of switch means including a recording and a reproducing switch means, a rewinding switch means and a fast forwarding switch means for controlling the energization of said first, second and third solenoids respectively, a first delay means operative to change over the operation mode from the fast forwarding or rewinding mode to the recording or reproducing mode in response to the manipulation of said recording and reproducing switch means during the fast forwarding or rewinding operation, a releasing switch means arranged to be actuated by said first delay means for interrupting the current supplied to said solenoids and restored to the original position after said solenoids have been released from the self-holding position, another switch means for energizing said first solenoid for a predetermined period of time in the initial stage of power supply to said system, said last-mentioned switch means being urged to the open position after said first solenoid has been energized and maintained in the self-holding position, and a second delay means for actuating said last-mentioned switch means, said second delay means being energized after said releasing switch means has been restored to the original position.

2. A control system for a magnetic recording and reproducing apparatus as claimed in claim 1, wherein the delay time of said first delay means is set so that the period of time during which said releasing switch means is actuated and is then restored to the original position is longer than the period of time required for a magnetic tape to be substantially stopped after the actuation of said releasing switch means.

* * * * *